US009357307B2

(12) United States Patent
Taenzer

(10) Patent No.: US 9,357,307 B2
(45) Date of Patent: May 31, 2016

(54) MULTI-CHANNEL WIND NOISE SUPPRESSION SYSTEM AND METHOD

(75) Inventor: Jon C. Taenzer, Los Altos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 668 days.

(21) Appl. No.: 13/368,100

(22) Filed: Feb. 7, 2012

(65) Prior Publication Data

US 2012/0207325 A1 Aug. 16, 2012

Related U.S. Application Data

(60) Provisional application No. 61/441,528, filed on Feb. 10, 2011, provisional application No. 61/441,396, filed on Feb. 10, 2011, provisional application No. 61/441,397, filed on Feb. 10, 2011, provisional (Continued)

(51) Int. Cl.
*H04B 15/00* (2006.01)
*H04R 3/00* (2006.01)
*H04R 5/04* (2006.01)

(52) U.S. Cl.
CPC .................. *H04R 5/04* (2013.01); *H04R 3/005* (2013.01); *H04R 2410/05* (2013.01); *H04R 2410/07* (2013.01)

(58) Field of Classification Search
CPC . G01L 21/02; G01L 21/0208; G01L 21/0216; G01L 21/0232; G01L 21/0272; G01L 2021/02165–2021/02166; G01L 25/0272; G01L 15/20; G01L 25/78; H04R 3/005; H04R 2410/05; H04R 2410/07; H04R 2430/20; H04R 25/407; H04R 25/505; H04R 2225/43; H04R 2499/11
USPC ............... 381/92, 94.1–94.3, 94.7, 317, 71.1, 381/122; 704/226, 228, 233; 379/406.01, 379/406.07, 392.01, 406.03, 406.14; 370/2, 370/286
See application file for complete search history.

(56) References Cited

U.S. PATENT DOCUMENTS

| | | | |
|---|---|---|---|
| 4,649,505 | A | 3/1987 | Zinser |
| 4,912,767 | A | 3/1990 | Chang |
| 5,208,786 | A | 5/1993 | Weinstein |
| 5,226,087 | A | 7/1993 | Ono |

(Continued)

FOREIGN PATENT DOCUMENTS

| | | |
|---|---|---|
| JP | 6029764 | 2/1994 |
| JP | 10327494 | 12/1998 |

(Continued)

OTHER PUBLICATIONS

Yousefian, et al., "Power Level Difference as a Criterion for Speech Enhancement" Acoustics, Speech and Signal Processing 2009, IEEE International Conference on Issue Date: Apr. 19-24, 2009, pp. 4653-4656.

(Continued)

*Primary Examiner* — Xu Mei

(57) ABSTRACT

A system and method for suppressing noise in one or more of at least first and second channels include obtaining a magnitude difference of signals in the first and second channels, obtaining a magnitude sum of signals in the first and second channels, obtaining a ratio of the magnitude difference to the magnitude sum, generating an attenuation value based on the ratio, selecting an attenuator based on the magnitude difference, and attenuating a signal in a channel by the attenuation value using the selected attenuator.

31 Claims, 4 Drawing Sheets

Related U.S. Application Data application No. 61/441,611, filed on Feb. 10, 2011, provisional application No. 61/441,511, filed on Feb. 10, 2011, provisional application No. 61/441,633, filed on Feb. 10, 2011.

(56) References Cited

U.S. PATENT DOCUMENTS

| | | | | |
|---|---|---|---|---|
| 5,251,263 | A | 10/1993 | Andrea et al. | |
| 5,288,955 | A | 2/1994 | Staple | |
| 5,568,559 | A | 10/1996 | Makino | |
| 5,701,344 | A | 12/1997 | Wakui | |
| 5,917,921 | A | 6/1999 | Sasaki | |
| 5,999,567 | A | 12/1999 | Torkkola | |
| 5,999,956 | A | 12/1999 | Deville | |
| 6,002,776 | A | 12/1999 | Bhadkamkar | |
| 6,091,830 | A | 7/2000 | Toki | |
| 6,108,415 | A | 8/2000 | Andrea et al. | |
| 6,317,709 | B1 * | 11/2001 | Zack | 704/225 |
| 6,343,268 | B1 | 1/2002 | Balan | |
| 6,424,960 | B1 | 7/2002 | Lee | |
| 6,526,148 | B1 | 2/2003 | Jourjine | |
| 6,549,630 | B1 | 4/2003 | Bobisuthi | |
| 6,688,169 | B2 | 2/2004 | Choe | |
| 6,741,714 | B2 | 5/2004 | Jensen | |
| 6,822,507 | B2 | 11/2004 | Buchele | |
| 6,857,312 | B2 | 2/2005 | Choe | |
| 6,859,420 | B1 | 2/2005 | Coney | |
| 6,983,264 | B2 | 1/2006 | Shimizu | |
| 7,043,043 | B2 | 5/2006 | Kakinuma | |
| 7,082,204 | B2 | 7/2006 | Gustavsson | |
| 7,171,008 | B2 | 1/2007 | Elko | |
| 7,174,023 | B2 | 2/2007 | Ozawa | |
| 7,181,030 | B2 | 2/2007 | Rasmussen | |
| 7,246,058 | B2 | 7/2007 | Burnett | |
| 7,274,794 | B1 | 9/2007 | Rasmussen | |
| 7,305,099 | B2 | 12/2007 | Gustavsson | |
| 7,383,178 | B2 | 6/2008 | Visser | |
| 7,415,372 | B2 | 8/2008 | Taenzer | |
| 7,436,188 | B2 | 10/2008 | Taenzer | |
| 7,464,029 | B2 | 12/2008 | Visser | |
| 7,472,041 | B2 | 12/2008 | Taenzer | |
| 7,617,099 | B2 | 11/2009 | Yang | |
| 7,619,563 | B2 | 11/2009 | Taenzer | |
| 7,885,420 | B2 * | 2/2011 | Hetherington | G10L 21/0208 381/94.2 |
| 8,428,275 | B2 * | 4/2013 | Yoshida | H04R 3/04 381/94.1 |
| 8,861,745 | B2 * | 10/2014 | Yen | H04R 1/1083 381/13 |
| 2003/0147538 | A1 * | 8/2003 | Elko | 381/92 |
| 2004/0039464 | A1 | 2/2004 | Virolainen | |
| 2004/0167777 | A1 | 8/2004 | Hetherington | |
| 2007/0047742 | A1 | 3/2007 | Taenzer | |
| 2007/0047743 | A1 | 3/2007 | Taenzer | |
| 2007/0047744 | A1 | 3/2007 | Harney | |
| 2007/0050441 | A1 | 3/2007 | Taenzer | |
| 2007/0058822 | A1 * | 3/2007 | Ozawa | G10L 21/0208 381/94.1 |
| 2008/0049953 | A1 | 2/2008 | Harney | |
| 2008/0152167 | A1 | 6/2008 | Taenzer | |
| 2008/0212794 | A1 * | 9/2008 | Ikeda | 381/94.1 |
| 2009/0055170 | A1 | 2/2009 | Nagahama | |
| 2009/0136057 | A1 | 5/2009 | Taenzer | |
| 2009/0154726 | A1 | 6/2009 | Taenzer | |
| 2009/0175466 | A1 * | 7/2009 | Elko et al. | 381/94.2 |
| 2009/0226006 | A1 * | 9/2009 | Meyer et al. | 381/94.1 |
| 2009/0316916 | A1 | 12/2009 | Haila | |

FOREIGN PATENT DOCUMENTS

| | | | |
|---|---|---|---|
| JP | 10327494 A | * | 12/1998 |
| JP | 2004232964 | | 8/2004 |
| JP | 2010028307 | | 2/2010 |
| WO | 03015459 | | 2/2003 |
| WO | 03015460 | | 2/2003 |

OTHER PUBLICATIONS

Elko, Gary W., "Adaptive Noise Cancellation with Directional Microphones" 1997 IEEE ASSP Workshop Issue Date: Oct. 19-22, 1997, p. 4.

Huang, Y., et al., "Real-Time Passive Source Localization: A Practical Linear-Correction Least-Squares Approach" IEEE Transactions on Speech and Audio Processing, vol. 9, No. 8, Nov. 2001, pp. 943-956.

Yousefian, N., et al., "Using Power Level Difference for Near Field Dual-Microphone Speech Enhancement" Applied Acoustics 2009.

Matsumoto, M., et al., "Modified Safia Utilizing Aggregated Microphones" Proceedings of the 24th IASTED International Multi-Conference Signal Processing, Pattern Recognition, and Applications, Feb. 15-17, 2006, Innsbruck, Austria, pp. 222-227.

Matsumoto, M., et al., "A Miniaturized Adaptive Microphone Array Under Directional Constraint Utilizing Aggregated Microphones" J. Acous. soc. AM Jan. 2006, pp. 352-359.

Girolami, M., "Symmetric Adaptive Maximum Likelihood Estimation for Noise Cancellation and Signal Separation" Electronics Letters, Aug. 14, 1997, vol. 33, No. 17, pp. 1437-1438.

* cited by examiner

MULTI-CHANNEL WIND NOISE SUPPRESSION SYSTEM AND METHOD

CROSS REFERENCE TO RELATED APPLICATIONS

This Application claims priority to related, U.S. Provisional Patent Application Nos. 61/441,528 filed on Feb. 10, 2011, hereby incorporated by reference in its entirety.

This application is related to U.S. Provisional Pat. Appl. No. 61/441,396 filed Feb. 10, 2011; U.S. Provisional Pat. Appl. No. 61/441,397 filed Feb. 10, 2011; U.S. Provisional Pat. Appl. No. 61/441,611 filed Feb. 10, 2011; U.S. Provisional Pat. Appl. No. 61/441,511 filed Feb. 10, 2011 and U.S. Provisional Pat. Appl. No. 61/441,633 filed Feb. 10, 2011.

TECHNICAL FIELD

The present disclosure relates generally to wind noise suppression for sound pickup devices such as headsets and the like.

BACKGROUND

The use of communication devices in windy conditions is an every-day occurrence for people around the world, but the microphone pickup of wind noise often interferes with effective communication. A basic characteristic of wind noise is that it is highly dynamic and non-stationary in time, much like the characteristic of speech, making it difficult to separate the wind noise from a noisy speech signal. Current state-of-the art headsets, handsets, car kits and the like utilize multiple microphones in array configurations, along with noise reduction algorithms, to reduce or remove acoustic background noise. Recognizing the fact that wind noise is heavily weighted toward the low frequencies, the interference of wind noise is often addressed by using high-pass filters in single-channel methods (sometimes in an adaptive manner). These methods reduce the audible wind noise, but such filters cut all low frequency sounds including that of the desired speech signals, producing a deterioration of sound quality and a reduction of speech intelligibility.

Wind noise is created at a microphone's input by the turbulent pressure fluctuations developed by moving air. These pressure fluctuations are effectively uncorrelated at multiple, spaced apart, microphones because the spatial coherence of the fluctuations decays rapidly with distance. Thus, wind noise picked up by spaced apart microphones is essentially uncorrelated, while the desired signal is correlated.

OVERVIEW

As disclosed herein, a wind noise suppression device for suppressing wind noise in one or more of at least first and second channels includes a differencing module configured to obtain a magnitude difference of signals in the first and second channels, a summing module configured to obtain a magnitude sum of signals in the first and second channels, a ratioing module configured to obtain a ratio of the magnitude difference to the magnitude sum, one or more attenuators each associated with a channel, an attenuation generator configured to generate an attenuation value based on the ratio from the ratioing module, and an attenuation steering module configured to select an attenuator based on the magnitude difference, the selected attenuator operative to attenuate the signal in the associated channel by the attenuation value.

Also as disclosed herein, a method for suppressing noise in one or more of at least first and second channels includes obtaining a magnitude difference of signals in the first and second channels, obtaining a magnitude sum of signals in the first and second channels, obtaining a ratio of the magnitude difference to the magnitude sum, generating an attenuation value based on the ratio, selecting an attenuator based on the magnitude difference, and attenuating a signal in a channel by the attenuation value using the selected attenuator.

Also as disclosed herein, a nonvolatile program storage device readable by a machine, embodying a program of instructions executable by the machine to perform a method for suppressing noise in one or more of at least first and second channels, the method including obtaining a magnitude difference of signals in the first and second channels, obtaining a magnitude sum of signals in the first and second channels, obtaining a ratio of the magnitude difference to the magnitude sum, generating an attenuation value based on the ratio, selecting an attenuator based on the magnitude difference, and attenuating a signal in a channel by the attenuation value using the selected attenuator.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DESCRIPTION OF EXAMPLE EMBODIMENTS

Figure 1:
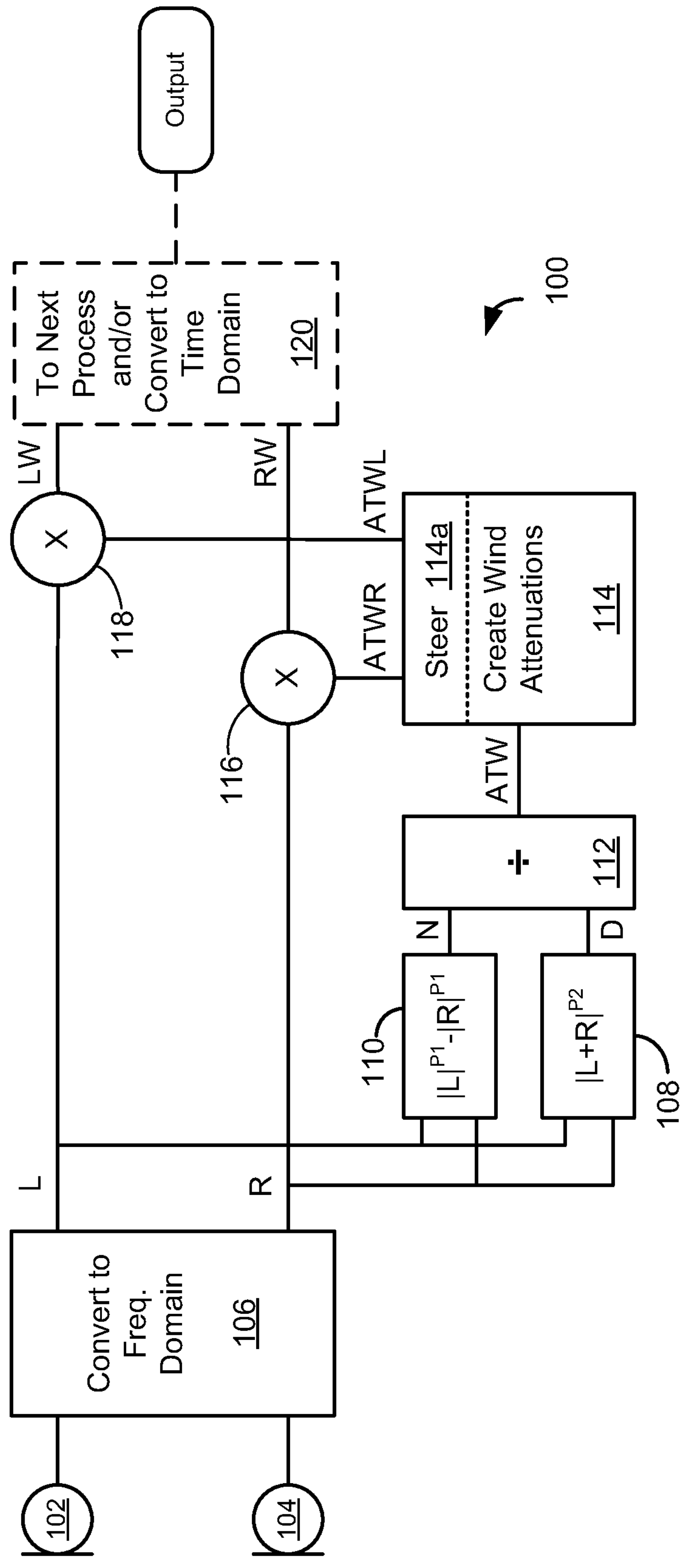
FIG. 1 is a block diagram of a multi-channel wind noise suppression system 100.

Example embodiments are described herein in the context of a multi-channel wind noise suppression method and system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The term "exemplary" is used exclusively herein to mean "serving as an example, instance or illustration." Any embodiment or arrangement described herein as "exemplary" is not necessarily to be construed as preferred or advantageous over other embodiments.

A basic characteristic of wind noise is that it is highly dynamic and non-stationary in time, much like the characteristic of speech, making it difficult to separate the wind noise from a noisy speech signal. However, in multi-microphone systems, wind noise, which is created at the sound inlet, or "port," of microphones, is poorly correlated between spaced-apart microphones.

As disclosed herein, a new multi-channel wind noise reduction method and system exploits the spatial independence of wind noise at physically separated sensor inputs. It takes advantage of the fact that wind disturbances affect each microphone differently; in particular, at different energy levels. By design, when there are N signals, or channels, the wind noise is individually suppressed in each channel, and N channels of wind-noise reduced signals are output. Operation can be partially or fully implemented in the time or frequency domains.

In recognition that wind turbulence noise is poorly correlated in space and time, the wind noise effects present in the output signals of separate microphones will be different from each other. In particular, the magnitude difference between the signals from the microphones generally will be much larger than that of the desired signal. When the signals are broken into very small temporal increments, the probability that there is significant wind noise energy in more than one signal at the same time approaches zero. Similarly, by breaking each signal into very small frequency increments, the probability that there is significant wind noise energy in more than one signal frequency increment at the same time also approaches zero.

Turning to FIG. 1, a block diagram of an exemplary two-channel system 100 for reducing the effects of wind noise is shown. The two-channel designation derives from the use of two microphones, 102, 104 to provide two input signals into the system. For ease of discussion, the microphones correspond to a right channel and a left channel, as indicated by the respective labels R and L. It will be recognized that more than two channels, corresponding to more than two microphones or other signal sources can be utilized, with the principles set forth herein being applicable to such systems with only trivial modifications.

The system 100 divides the signals from each of the microphones 102, 104 into small increments, which can be time or frequency increments, or both. A signal domain converter 106 converts the time domain signals from the microphones into the frequency domain. Then, in each corresponding time/frequency increment, a set of new signals indicative of the magnitude sums and differences of the original individual array microphone signals are generated. One approach for accomplishing this can be in accordance with Equation 1 below, and can be performed using summing module 108 and differencing module 110. The resultant sum and difference signals are applied to a divider module 112, which divides the differences by the sums. Attenuation values are generated for each increment in an attenuation value generator 114. The attenuation value for each increment is described in Equation 1 as follows:

$$ATW_i = \frac{(|L_i|)^{p1} - (|R_i|)^{p1}}{(|L_i + R_i|)^{p2} + k} \qquad (1)$$

wherein ATW is the wind noise attenuation value, L and R are the left (102) and right (104) microphone signals in this exemplary two-channel system and, i, is a time index.

It should be noted that as described herein, the procedure of "obtaining the magnitude sum" is intended to encompass both 1) summing the signals involved then taking the magnitude of the result as in Equation 1 above, and 2) obtaining the magnitudes of each of the signals involved, then summing these magnitudes together. Thus when referring to "obtaining the magnitude sum," either of these approaches is contemplated. Similarly, the procedure of "obtaining the magnitude difference" is intended to encompass both 1) subtracting one signal from the other then determining the magnitude of the difference and 2) determining the magnitude of each of the signals involved, and then determining the difference of these magnitudes (the latter approach is taken in Equation 1). In "obtaining the magnitude difference," the sign of the difference (that is, which channel is larger in magnitude, which is indicative of which channel contains the greater wind noise component), is tracked in order to properly direct the attenuation to the appropriate (left or right) channel. This attenuation directing, or steering, is performed by a steering module 114*a*. It is further intended that the procedure of "obtaining the magnitude" includes obtaining a signal amplitude value, signal rms value, signal energy value, or any other signal level measure.

Moreover, in the discussion below, it should be noted that the less attenuation applied, the more of the original signal is preserved; conversely, the more attenuation applied, the less of the original signal is preserved. In effect, zero attenuation means that no attenuation is applied, and the original signal is passed unattenuated. Conversely, if the maximum range of attenuation is from 0 to 1, then an attenuation of 1 means the maximum attenuation is applied, and minimum, or zero, original signal is passed.

The variables $p_1$ and $p_2$ are powers to which the individual components can be raised to control the amount of attenuation that is applied to the output signals. The variables $p_1$ and $p_2$ are not necessarily integers and are not limited to real numbers, but are typically real numbers in the range from 1 to 10. In one embodiment, they are both selected to be 2 ($p_1=p_2=2$). Moreover, different values of $p_1$ and $p_2$ may be selected for the numerator terms and denominator terms in the above equation—that is, $p_1$ need not equal $p_2$. Selection of the powers $p_1$ and $p_2$ can be made with an eye to preserving the sign of the difference, in order to properly direct the attenuation to the appropriate channel. Alternatively, the sign can be separately determined independent of the difference determination, or, in the case where the power is applied to a difference value, the sign can be extracted and preserved prior to application of the power operation. Adding the constant k to the denominator before dividing, k typically being selected to be a very small number such as $10^{-99}$, can be performed to avoid the difficulties associated with dividing by zero. The calculation of Equation 1 is performed separately on each frequency/time increment.

Using the example of the two-microphone array of system 100, if there is only wind noise energy in just one microphone signal at a time, then the magnitudes of the sum and of the difference signals will be identical and the value of the magnitude of ATW will be "1" since the numerator and denominator in Equation 1 will be identical. However, there will be a sign difference depending on whether the wind noise is in the left channel or in the right channel. In the above convention, if the wind noise is predominantly in the left channel signal (mic 102), the sign will be positive, while if the predominant energy is in the right channel signal (mic 104) it will be negative. The significance of this sign preservation will be discussed in detail below.

Alternatively, the desired signal, for example voice, will have the same magnitude, or nearly the same, in each incremental pair of the original signals, but not in the sum and difference pair. The magnitude of the difference (numerator) will be quite small while the magnitude of the sum (denominator) will be approximately twice that of either signal. In this case, Equation 1 above indicates that ATW will be close to or equal to "0".

It is intended that well known principles for signal matching are within the scope of this application, and that the signals input to this multi-channel wind noise suppression system/method may be modified versions of the signals directly available from the microphones themselves. For example, the microphone signals may be amplified to overcome additive noise in an electronic system incorporating this wind noise suppression technology. Also, the microphone signals preferentially may be matched in amplitude and/or phase and/or time delay for the desired signal using well known preprocessing means, prior to the wind noise suppression technology of the present application. In many broadside microphone array applications, the desired signal is inherently well matched in the original signals. In other applications, such as in end-fire microphone array applications, the desired signal may need to be matched first before the wind-noise suppression is applied. All such system configurations are contemplated as included for this technology.

For example, assuming that the desired (voice) signal is the same in both original signals, or matched after reception, then the magnitude of the sum signal will be twice the magnitude of either original signal, but the magnitude of the difference signal will be zero. In other words, the magnitude difference between the sum and difference signals will be very large for the desired signal component, but very small for the wind noise component. In the high-wind case, that difference between the numerator and denominator will approach 0, and the ratio will approach unity, since the numerator and denominator will both be almost the same, whereas in the low-wind or high desired-signal case, that difference between the numerator and denominator will be non-negligible—that is, significantly greater than 0, and the ratio will approach 0. Applying the process described by Equation 1 above and illustrated in block diagram in FIG. 1, desired signal components will manifest in small attenuation values, while wind noise components will manifest in attenuation values very close to ±1. This means that wind noise can be readily distinguished by the difference in magnitudes of the sum/difference pair of signals and can be treated differently.

Next, the attenuation values, ATW, are applied to the individual microphone channel signals, to thereby suppress the windy portions of the signals as necessary and result in the generation of multiple wind-noise reduced, but separate, signals that can be used in any subsequent multi-channel process. One manner of applying the attenuation to the microphone signals is to weight the signals in the two channels differently, as a function of the attenuation values and their sign. In one embodiment, a right channel multiplier 116 and a left channel multiplier 118 are utilized to apply the attenuation weight values ATWR and ATWL to the respective right and left channels, each multiplier multiplying the channel signal by a factor that is a function of the attenuation signal ATW. For maximum attenuation—that is, ATW close to ±1—the factor by which the channel signal is multiplied can be a very small fraction, or even zero (to thereby completely suppress that channel's signal). For minimum attenuation—that is, ATW close to 0—the factor by which the channel signal is multiplied can be close to one, thereby passing the channel signal substantially or completely unaltered or unsuppressed. Which channel is treated in this manner can be determined by the sign of ATW, which will indicate which of the channels has the greater noise and warrants greater suppression.

To demonstrate this application of the attenuation values ATW, first a separate attenuation value for each channel is derived as follows:

$$g(a) = \begin{cases} 1, & \text{if } a \le 0 \\ 0, & \text{if } a > 1 \\ 1 - a, & \text{if } 0 < a \le 1 \end{cases} \tag{2}$$

$$ATWL_i = \overrightarrow{g(ATW_i)}$$

As shown in Equation 2, the attenuation to be applied to the left channel in this two microphone example is "1" whenever ATW is less than or equal to zero, "0" whenever ATW is greater than one, and 1−ATW whenever ATW is between zero and one. The arrow over Equation 2 indicates that like Equation 1 this calculation is performed separately for each frequency/time increment.

$$h(a) = \begin{cases} 1, & \text{if } a \ge 0 \\ 0, & \text{if } a < -1 \\ 1 + a, & \text{if } -1 \le a < 0 \end{cases} \tag{3}$$

$$ATWR_i = \overrightarrow{h(ATW_i)}$$

As shown in Equation 3, the attenuation to be applied to the right channel is "1" whenever ATW is greater than or equal to zero, "0" whenever ATW is less than minus one, and ATW+1 whenever ATW is between minus one and zero. In other words, the positive values of ATW are applied to the left channel signal and the negative values of ATW are applied to the right channel signal, in the manner explained above, to create two separate and independent channel attenuation signals ATWL and ATWR.

These separate channel attenuation weight value signals ATWL and ATWR are then used to suppress the wind noise in each channel's signal as necessary. It should be noted that for each time and/or frequency increment, at least one channel will be passed without attenuation, as evident from Equations 1, 2 and 3 above. In other words, for each time/frequency increment the attenuation is calculated on information from both channels, and used to attenuate only the channel with more wind noise, passing the other channel unattenuated.

In one implementation, the suppression is implemented multiplicatively, using multipliers 116 and 118. In the two-channel example being used here, $$LW_i=\overline{L_i \times \mathrm{ATWL}_i}\quad RW_i=\overline{R_i \times \mathrm{ATWR}_i} \tag{4}$$

the wind-reduced left channel output signal, LW, is the product of the original left channel input signal, L, times the left channel attenuation value signal, ATWL. Similarly, the wind reduced right channel output signal, RW, is the product of the original right channel input signal, R, times the right channel attenuation value signal, ATWR. These calculations are shown in Equation 4. The outputs are then passed to the next process in the device, which can be implemented using a different processing module 120. Examples of such further processing include transmission via a wired or wireless network to a remote listening or recording device, recording at a local device, or the like. Additionally, further sound processing can be implemented, such as that for enhancement of noise discrimination, signal matching, beam forming or the like. By removing the wind noise component while still preserving the original channel signals, the system and method described herein allows for flexible application in virtually any multi-channel microphone array system. For example, it is compatible with many beam formers because it only affects the magnitudes of the signals while the phase is preserved. In some applications, use can be made of the magnitude of the unattenuated signal, which can be applied to the opposite channel signal or vector fractions of the unattenuated channel signal can be mixed into the attenuated signal to recreate magnitude information to preserve good desired signal output.

Figure 2:
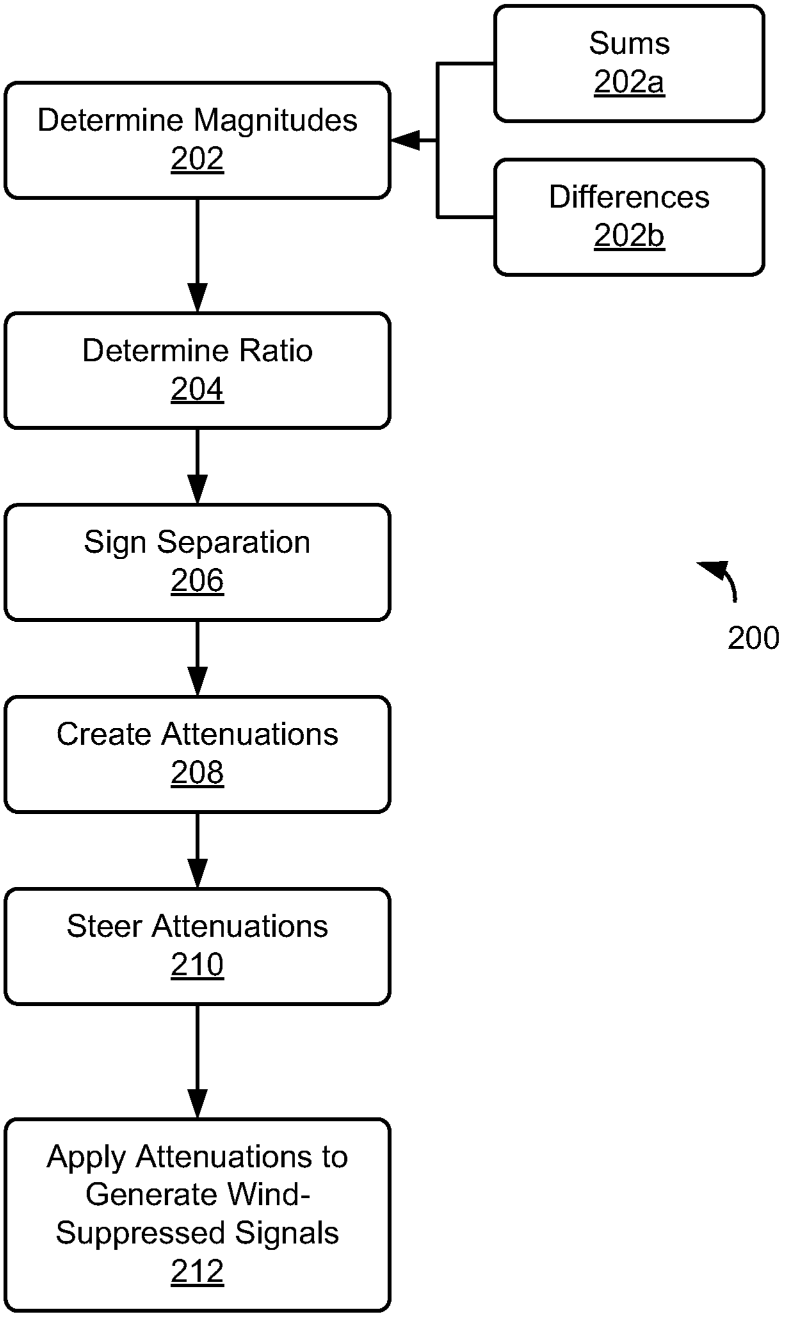
FIG. 2 is a flow diagram of a process for multi-channel wind noise suppression.

The above calculations are performed in a process 200 illustrated in FIG. 2, in which, at 202, magnitude sums (202*a*) and differences (202*b*) of the vector signal increments are formed. At 204, these new sum/difference signals are ratioed (that is, their ratio is determined), thereby creating a set of attenuation values ranging between "+1" and "−1". At 206, the attenuation values are broken into separate sets of channel attenuation values based upon the sign of the attenuation values. Subsequently, at 208, the separate channel attenuation values are created, and at 210, they are steered to the appropriate signal attenuator. At 212, separate wind noise-suppressed channel signals are generated by application of the separate attenuation values to the separate channel signals by multiplication in signal attenuators.

Figure 3:
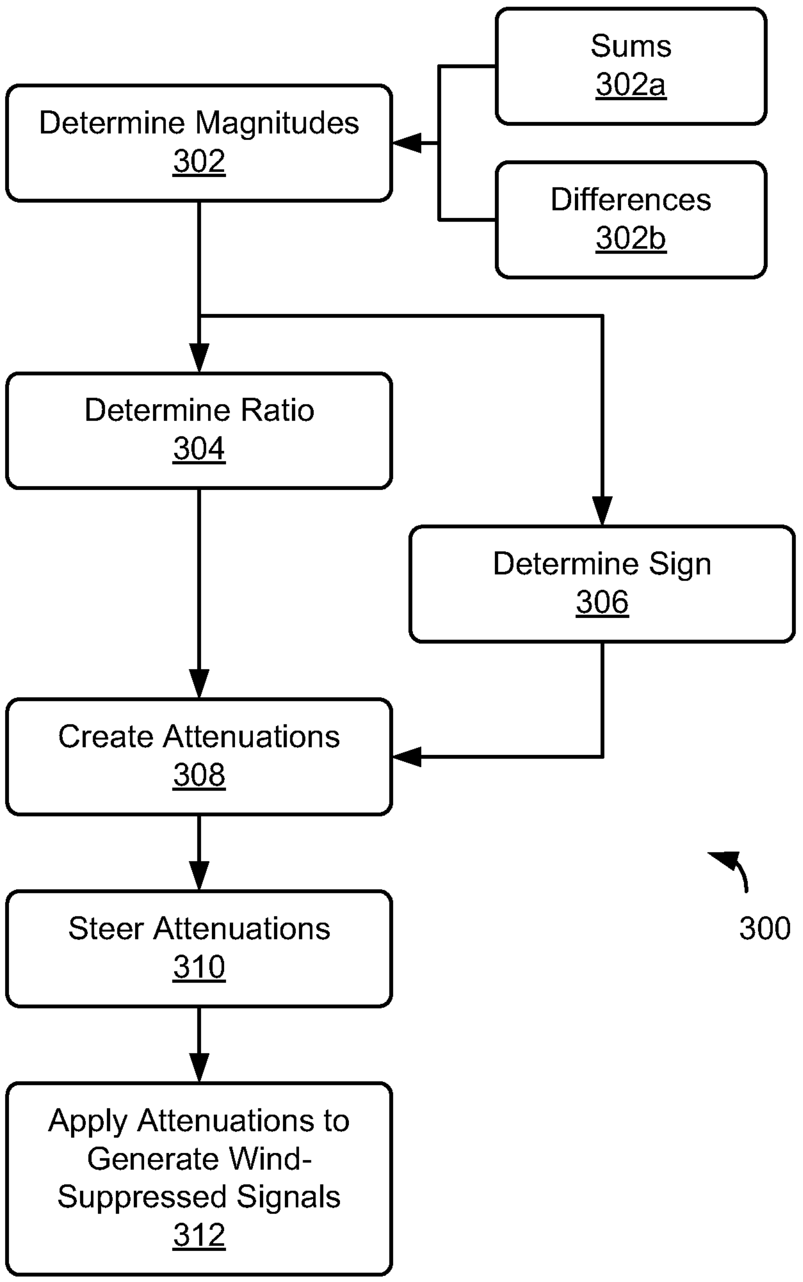
FIG. 3 is a flow diagram of an alternate process for multi-channel wind noise suppression.

Alternatively, the sign can be determined separately, as shown in FIG. 3, in which, at 302, magnitude sums (302*a*) and differences (302*b*) of the vector signal increments are formed. At 304, these new sum/difference signals are ratioed, thereby creating a set of attenuation values ranging between "0" and "1". At 306, the magnitude sum and difference values are used to determine a sign. Subsequently, at 308, the separate channel attenuation values are created, steered appropriately at 310 based on the sign, and at 312, the steered attenuation values are applied to the separate channel signals by multiplication to generate separate wind noise suppressed channel signals.

Figure 4:
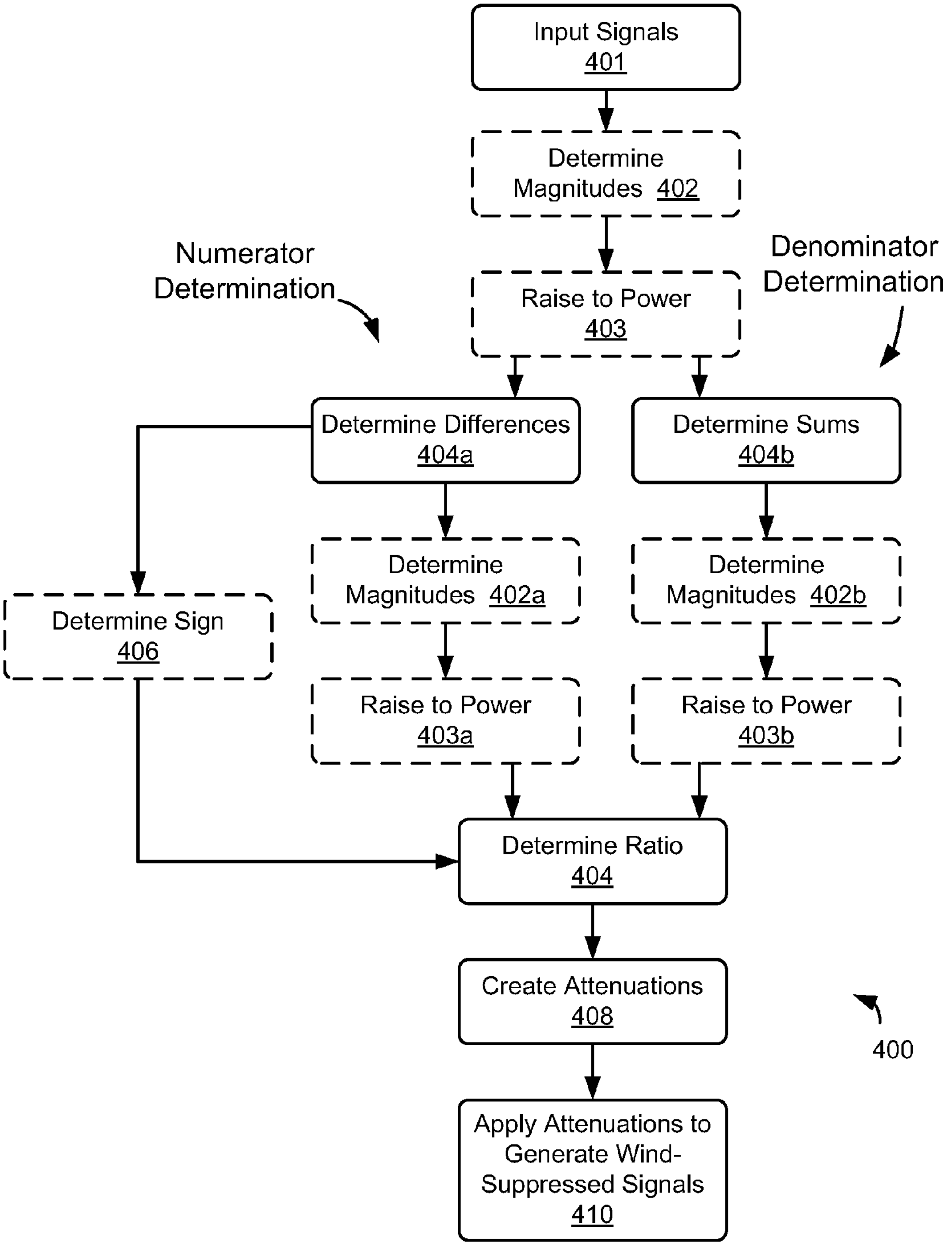
FIG. 4 is a flow diagram of a generalized process for multi-channel wind noise suppression.

FIG. 4 provides a more generalized illustration of the process of the present invention, designated as process 400. The vector signal increments of the input signals are optionally converted to magnitudes values at 402. The magnitude values can optionally be raised to a power or powers at 403. Either the signal values, the magnitudes of the signal values, the magnitudes of the signal values raised to a power, or the signal values raised to a power, are used to calculate sums and differences at 404*b* and 404*a* respectively. If magnitudes were not previously determined for the signal values at 402, magnitudes can alternatively be determined for the sum and difference values at 402*a* and 402*b* respectively. If the signal values were not raised to a power at 403, the sum and difference values, or the magnitudes of the sum and difference values, can alternatively be raised to a power or powers at 403*a* and 403*b*. The power to which signal values or magnitude values of signals are raised in 403 need not be the same for exponentiation of the values passed to the differences determined at 404*a* and the sums determined at 404*b*, and the power to which difference values and sum values respectively, or magnitudes of difference values and magnitudes of sum values respectively, are raised at 403*a* and 403*b* need not be equal to each other. Also, the sequence in which magnitudes and powers are determined need not be the same in the numerator determination path (the difference path) as in the denominator determination path (the sum path). In addition, the step of determining the powers can be omitted altogether, which is the equivalent of taking the value to a power of unity. The ratio is determined at 404. If the selection of power values and the application sequence of determination of magnitudes are chosen such that the sign of the difference calculation is preserved at the output of 404, then the resulting ratio will inherently have the desired sign. However, other choices are also consistent with the disclosed embodiments, in which case, optional step 406 comprises separate determination of the sign obtained in the differencing operation, and the providing of that sign to the determine ratio step 404. The determine ratio step 404 divides the numerator provided from the numerator determination path by the denominator provided by the denominator determination path, and optionally applies the sign from the determine sign step 406. At 408, the separate channel attenuation values are created in a manner such as that illustrated in Equations 1-3 and described in detail above, and, at 410, the attenuation values are applied as needed to the separate channel signals to generate separate wind noise suppressed channel signals.

There are several methods to utilize this technology for multi-channel systems of three or more channels. In a first method, pairs of channels can be selected, and the above described process is applied to those pairs. For example, in a four channel system, channel signals #1 and #2 are processed as disclosed above, then channel signals #3 and #4 are similarly processed, resulting in four channels of wind noise reduced signals. In a second approach, instead of processing pairs of channel signals, the wind attenuations from multiple pairs can be combined to create the ATWx signals. For example, in a three channel system, first channel signals #1 and #2 are processed to create the ATW1-1 and ATW2-1 attenuations, second channel signals #2 and #3 are processed to create the ATW2-2 and ATW3-2 attenuations, and lastly channel signals #3 and #1 are processed to create the ATW3-3 and ATW1-3 attenuations. Subsequently, the two ATW1 attenuations, ATW1-1 and ATW1-3, are combined by multiplication and applied to the #1 channel signal to remove it's wind component. Similarly the attenuations ATW2-1 and ATW2-2 are combined and applied to the #2 channel signal, while the attenuations ATW3-2 and ATW3-3 are combined and applied to the #3 channel signal. Thereby all three channel signals are wind noise reduced. The wind noise reduced multi-channel signals can be used as the input signals for virtually any multi-channel system, for example a beam former.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A wind noise suppression device for suppressing wind noise in one or more of at least first and second channels, the device comprising:

a differencing module configured to obtain a magnitude difference of signals in the first and second channels;

a summing module configured to obtain a magnitude sum of signals in the first and second channels;

a ratioing module configured to obtain a ratio of the magnitude difference to the magnitude sum;

a first attenuator associated with the first channel and a second attenuator associated with the second channel;

an attenuation generator configured to generate an attenuation value based on the ratio from the ratioing module; and an attenuation steering module configured to select the first or second attenuator based on the magnitude difference, the selected attenuator operative to attenuate the signal in the associated channel by the attenuation value.

2. The device of claim 1, wherein one or more of the differencing module, summing module, ratioing module, attenuation generator, first attenuator, and second attenuator operates in the frequency domain.

3. The device of claim 1, wherein one or more of the differencing module, summing module, ratioing module, attenuation generator, first attenuator, and second attenuator operates in the time domain.

4. The device of claim 1, wherein one or both the summing and differencing modules raises one or more associated magnitudes to an exponential power.

5. The device of claim 4, wherein the exponential power to which the summing module raises an associated magnitude is different from the exponential power to which the differencing module raises an associated magnitude.

6. The device of claim 4, wherein the exponential power is two.

7. The device of claim 1, wherein the first and second attenuators are multipliers configured to selectively multiply the signals in the associated channels by factors that are functions of the attenuation value.

8. The device of claim 1, wherein device operation is in accordance with the equation wherein ATW, represents wind noise attenuation at a particular time increment, L, is a signal in the first channel at the time increment, R, is a signal in the second channel at the time increment, p1 and p2 are numbers selected between 1 and 10, preferably 2, and k is a small constant $$ATW_i = \frac{(|L_i|)^{p1} - (|R_i|)^{p1}}{(|L_i + R_i|)^{p2} + k}.$$

9. The device of claim 1, said device comprising a headset having first and second microphones respectively corresponding to the first and second channels.

10. The device of claim 1, said device being operative in discrete time and/or frequency increments.

11. The device of claim 10, wherein for each time and/or frequency increment, at least one channel remains unattenuated.

12. A method for suppressing noise in one or more of at least first and second channels, the method comprising:

obtaining a magnitude difference of signals in the first and second channels;

obtaining a magnitude sum of signals in the first and second channels;

obtaining a ratio of the magnitude difference to the magnitude sum;

generating an attenuation value based on the ratio;

selecting an attenuator from a first and a second attenuator based on the magnitude difference; and attenuating a signal in a channel by the attenuation value using the selected first or second attenuator.

13. The method of claim 12, wherein one or more of the obtaining a magnitude difference, obtaining a magnitude sum, obtaining a ratio, generating an attenuation value, selecting an attenuator, and attenuating is conducted in the frequency domain.

14. The method of claim 12, wherein one or more of the obtaining a magnitude difference, obtaining a magnitude sum, obtaining a ratio, generating an attenuation value, selecting an attenuator, and attenuating is conducted in the time domain.

15. The method of claim 12, wherein one or both of obtaining a magnitude difference and obtaining a magnitude sum comprises raising one or more associated magnitudes to an exponential power.

16. The method of claim 15, wherein the exponential power associated with obtaining a magnitude difference is different from the exponential power associated with obtaining a magnitude sum.

17. The method of claim 15, wherein the exponential power is two.

18. The method of claim 12, wherein attenuating comprises multiplying by a factor that is a function of the attenuation value.

19. The method of claim 12, said method being conducted in accordance with the equation wherein ATW, represents wind noise attenuation at a particular time increment, L, is a signal in the first channel at the time increment, R, is a signal in the second channel at the time increment, $p_1$ and $p_2$ are numbers selected between 1 and 10, preferably 2, and k is a small constant $$ATW_i = \frac{(|L_i|)^{p1} - (|R_i|)^{p1}}{(|L_i + R_i|)^{p2} + k}.$$

20. The method of claim 12, wherein said method is performed in discrete time and/or frequency increments.

21. The method of claim 20, wherein for each time and/or frequency increment, at least one channel remains unattenuated.

22. A nonvolatile program storage device readable by a machine, embodying a program of instructions executable by the machine to perform a method for suppressing noise in one or more of at least first and second channels, the method comprising:

obtaining a magnitude difference of signals in the first and second channels;

obtaining a magnitude sum of signals in the first and second channels;

obtaining a ratio of the magnitude difference to the magnitude sum;

generating an attenuation value based on the ratio;

selecting an attenuator from a first and a second attenuator based on the magnitude difference; and attenuating a signal in a channel by the attenuation value using the selected first or second attenuator.

23. The device of claim 22, wherein one or more of the obtaining a magnitude difference, obtaining a magnitude sum, obtaining a ratio, generating an attenuation value, selecting an attenuator, and attenuating is conducted in the frequency domain.

24. The device of claim 22, wherein one or more of the obtaining a magnitude difference, obtaining a magnitude sum, obtaining a ratio, generating an attenuation value, selecting an attenuator, and attenuating is conducted in the time domain.

25. The device of claim 22, wherein one or both of obtaining a magnitude difference and obtaining a magnitude sum comprises raising one or more associated magnitudes to an exponential power.

26. The device of claim 25, wherein the exponential power associated with obtaining a magnitude difference is different from the exponential power associated with obtaining a magnitude sum.

27. The device of claim 25, wherein the exponential power is two.

28. The device of claim 22, wherein attenuating comprises multiplying by a factor that is a function of the attenuation value.

29. The device of claim 22, said method being conducted in accordance with the equation wherein ATW, represents wind noise attenuation at a particular time increment, L, is a signal in the first channel at the time increment, R, is a signal in the second channel at the time increment, p1 and p2 are numbers selected between 1 and 10, preferably 2, and k is a small constant.

30. The device of claim 18, wherein said method for suppressing noise is performed in discrete time and/or frequency increments.

31. The device of claim 30, wherein for each time and/or frequency increment, at least one channel remains unattenuated.

* * * * *